(12) United States Patent
Tamura et al.

(10) Patent No.: US 8,980,997 B2
(45) Date of Patent: Mar. 17, 2015

(54) ADHESIVE COMPOSITION

(75) Inventors: Koki Tamura, Kawasaki (JP); Takahiro Asai, Kawasaki (JP); Atsushi Kubo, Kawasaki (JP); Hirofumi Imai, Kawasaki (JP); Takahiro Yoshioka, Kawasaki (JP)

(73) Assignee: Tokyo Ohka Kogyo Co., Ltd., Kanagawa (JP)

( * ) Notice: Subject to any disclaimer, the term of this patent is extended or adjusted under 35 U.S.C. 154(b) by 0 days.

(21) Appl. No.: 13/157,568

(22) Filed: Jun. 10, 2011

(65) Prior Publication Data

US 2011/0306720 A1 Dec. 15, 2011

(30) Foreign Application Priority Data

Jun. 15, 2010 (JP) ................................. 2010-136465

(51) Int. Cl.
*C08G 61/08* (2006.01)
*C08L 55/00* (2006.01)
*C09J 123/08* (2006.01)

(52) U.S. Cl.
CPC ................................. *C09J 123/0823* (2013.01)
USPC .......................................... 524/553; 524/474

(58) Field of Classification Search
CPC .................................................. C09J 123/0823
USPC .................................................. 524/474, 553
See application file for complete search history.

(56) References Cited

U.S. PATENT DOCUMENTS

| | | | | |
|---|---|---|---|---|
| 3,640,977 | A * | 2/1972 | Gonzenbach et al. | 526/283 |
| 5,888,703 | A | 3/1999 | Tomo | |
| 6,255,396 | B1 | 7/2001 | Ding et al. | |
| 7,015,276 | B2 | 3/2006 | Morita et al. | |
| 8,298,365 | B2 * | 10/2012 | Imai et al. | 156/310 |
| 2004/0039122 | A1 | 2/2004 | Morita et al. | |
| 2010/0069593 | A1 | 3/2010 | Asai et al. | |
| 2010/0086799 | A1 | 4/2010 | Asai et al. | |
| 2010/0112305 | A1 | 5/2010 | Hong et al. | |
| 2011/0086955 | A1 | 4/2011 | Hong et al. | |
| 2012/0073741 | A1 | 3/2012 | Asai et al. | |
| 2012/0083561 | A1 | 4/2012 | Imai et al. | |
| 2012/0291938 | A1 | 11/2012 | Hong et al. | |

FOREIGN PATENT DOCUMENTS

| | | | |
|---|---|---|---|
| JP | 50-76144 | 6/1975 | |
| JP | 5-279554 | 10/1993 | |
| JP | 7-224270 | 8/1995 | |
| JP | 9-157628 | 6/1997 | |
| JP | 11-158225 | 6/1999 | |
| JP | 11-269394 | 10/1999 | |
| JP | 2000-304920 | 11/2000 | |
| JP | 2000327878 | * 11/2000 | ............. C08L 45/00 |
| JP | 2001-279208 | 10/2001 | |
| JP | 2003-3048 | 1/2003 | |
| JP | 2003-173993 | 6/2003 | |
| JP | 2008-133405 | 6/2008 | |
| JP | 2008-202003 | 9/2008 | |
| JP | 2008-214365 | 9/2008 | |
| JP | 2008-231384 | 10/2008 | |
| JP | 2010-109324 | 5/2010 | |
| JP | 2011-219506 | 11/2011 | |
| JP | 2012-507600 | 3/2012 | |
| WO | 2010/143510 | 12/2010 | |

OTHER PUBLICATIONS

International Search Report (with English translation) issued Jul. 20, 2010 in International Application No. PCT/JP2010/058558.
Abstract of JP 8-92441, Apr. 1996.
Abstract of JP 2001-187874, Jul. 2001.
Abstract of JP 2010-109324, May 2010.
Partial translation of Japanese Application No. 50-76144, 1975.
Office Action issued Jan. 22, 2014 in U.S. Appl. No. 13/240,415.
Office Action issued May 14, 2014 in U.S. Appl. No. 13/240,415.
Sam Zwenger et al., "Plant terpenoids: applications and future potentials", Biotechnology and Molecular Biology Review, Feb. 2008, vol. 3, No. 1, pp. 001-007.
Office Action issued Oct. 31, 2013 in copending U.S. Appl. No. 13/240,415.
Office Action issued Jun. 13, 2013 in copending U.S. Appl. No. 13/240,415.
"condensation", Hawley's Condensed Chemical Dictionary, John Wiley & Sons, Inc., 2002, 14th Edition.
Office Action mailed Jul. 22, 2014 in U.S. Appl. No. 13/240,415.
Official Action issued on Nov. 24, 2014 in co-pending U.S. Appl. No. 13/240,415.

* cited by examiner

*Primary Examiner* — David W Wu
*Assistant Examiner* — Marie Reddick
(74) *Attorney, Agent, or Firm* — Wenderoth, Lind & Ponack, L.L.P.

(57) ABSTRACT

Disclosed is an adhesive composition in which a solid component is dissolved in a solvent, the solid component being dissolved in the solvent to have a solid component content of not less than 20% by weight with respect to a total amount of the solid component and the solvent, the solid component containing resin obtained by polymerizing a monomer composition that contains a cycloolefin monomer, the solvent having no carbon-carbon double bond, and an alcohol content contained in the solvent being not more than 0.45% by weight with respect to an entire amount of the solvent.

4 Claims, No Drawings

ADHESIVE COMPOSITION

This Nonprovisional application claims priority under 35 U.S.C. §119(a) on Patent Application No. 2010-136465 filed in Japan on Jun. 15, 2010, the entire contents of which are hereby incorporated by reference.

TECHNICAL FIELD

The present invention relates to an adhesive composition. For instance, the present invention relates to an adhesive composition suitably used when processing a substrate such as a semiconductor wafer, for temporally fastening the substrate to a supporting body such as a glass plate, a film, and the like.

BACKGROUND ART

A thin semiconductor silicon chip is manufactured, for example, in a method as follows: (i) a high purity single crystal silicon or the like is sliced to a wafer form, (ii) a predetermined circuit pattern is formed on a surface of the wafer by photoresist, (iii) a back surface of the semiconductor wafer thus obtained is subjected to grinding, and (iv) after the semiconductor wafer is grinded to a predetermined thickness, the semiconductor wafer is diced so as to form a chip shape. In such a manufacturing process, the thin wafer itself is fragile and easily breakable; hence, it is necessary to reinforce the thin wafer. Furthermore, it is also necessary to prevent the circuit pattern formed on the surface of the wafer from being contaminated due to grinding dust and the like generated in the grinding process. Methods such as the following are known as methods of preventing the breakage of the wafer and protecting the circuit pattern provided on the surface of the wafer: a method in which the wafer is grinded in a state in which the supporting body is temporally fastened to the adhesive layer, and thereafter the supporting body is stripped off (see for example Patent Literature 1 and Patent Literature 2); and a method in which the wafer is grinded in a state in which an adhesive film having an adhesive layer is adhered on the surface of the wafer on which the circuit pattern is provided, and thereafter the adhesive film is stripped off (see for example Patent Literature 3 and Patent Literature 4).

In recent years, demands have been increasing for achievement of small sized, thin, and highly functioned electronic apparatuses. In this trend, in replacement of the wire bonding technique that conventionally has been the main current as a wiring technique for connecting electrodes (bumps) and a circuit board in a System in Package (SiP) for example, a through-hole formation technique has been gaining attention as the wiring technique. The through-hole formation technique is a technique in which a chip formed with a through-hole electrode is stacked to form a bump on a back side of the chip. In order to employ the through-hole formation technique, it is necessary to manufacture a chip having a through-hole electrode, by forming a through-hole electrode on a semiconductor wafer which is grinded to a predetermined thickness. The forming of the through-hole electrode on the semiconductor wafer requires going through many processes, including high temperature processing and high vacuum processing.

If the grinding process is carried out in the methods disclosed in Patent Literatures 1 to 4 upon adhering the supporting body or adhesive film to the semiconductor wafer, and the through-hole electrode is formed thereafter, the adhesive layer becomes exposed to a high temperature while the semiconductor wafer is subjected to the process of forming the through-hole electrode. However, the adhesive used in the adhesive layer for temporally fastening the supporting body, and the adhesive used in the adhesive layer for adhering the adhesive film, each in the methods of Patent Literatures 1 to 4, do not have sufficient thermal resistance. As a result, problems occur caused by the adhesive layer being exposed to high temperature, such as that the resin of the adhesive layer deteriorates thereby causing a decrease in its adhesive strength, or that moisture absorbed by the adhesive layer evaporates as gas under the high temperature, which gas causes the adhesive layer to peel off at these bubbles of air, thereby causing poor adhesion. Furthermore, even when the adhesive layer is to be stripped off (the supporting body or adhesive film is stripped off), once the adhesive layer is exposed to high temperature, poor stripping easily occurs, such as having residue remaining when the adhesive layer is stripped off. Moreover, in a case where the forming of the through-hole electrode requires carrying out a process in a high temperature high vacuum environment, not only does the gas generated by decomposition of the adhesive layer itself in the high temperature and the gas generated from the moisture in the adhesive layer cause the poor adhesion as described above, but also these gases hinder the maintaining of the vacuum environment.

In view of the problems, an adhesive composition whose main component is a specific acrylic resin has been proposed as an adhesive composition which has good thermal resistance and which exhibits sufficient adhesive strength in a high temperature environment (see for example Patent Literature 5). Moreover, an adhesive composition containing (i) an alicyclic structure-containing polymer having a specific molecular weight and (ii) a low molecular weight compound having a specific molecular weight has been proposed as a thermally resistant adhesive resin composition, for use in adhering an electronic component and a substrate (Patent Literature 6).

Meanwhile, norbornene resin is known for its outstanding transparency, thermal resistance, low moisture absorbency, low birefringence, moldability, and the like; reports have been made which disclose that norbornene resin is used for optical disk substrates, and molding of optical films such as a phase difference compensating film and a polarizing plate protective film (for example, see Patent Literatures 7 to 9).

CITATION LIST

Patent Literature

Patent Literature 1
Japanese Patent Application Publication, Tokukaihei, No. 7-224270 A (Publication Date: Aug. 22, 1995)
Patent Literature 2
Japanese Patent Application Publication, Tokukaihei, No. 9-157628 A (Publication Date: Jun. 17, 1997)
Patent Literature 3
Japanese Patent Application Publication, Tokukai, No. 2003-173993 A (Publication Date: Jun. 20, 2003)
Patent Literature 4
Japanese Patent Application Publication, Tokukai, No. 2001-279208 A (Publication Date: Oct. 10, 2001)
Patent Literature 5
Japanese Patent Application Publication, Tokukai, No. 2008-133405 A (Publication Date: Jun. 12, 2008)
Patent Literature 6
Japanese Patent Application Publication, Tokukaihei, No. 11-269394 A (Publication Date: Oct. 5, 1999)

Patent Literature 7

Japanese Patent Application Publication, Tokukaihei, No. 5-279554 A (Publication Date: Oct. 26, 1993)

Patent Literature 8

Japanese Patent Application Publication, Tokukai, No. 2000-304920 A (Publication Date: Nov. 2, 2000)

Patent Literature 9

Japanese Patent Application Publication, Tokukai, No. 2003-003048 A (Publication Date: Jan. 8, 2003)

SUMMARY OF INVENTION

Technical Problem

However, in a case where a cycloolefin polymer such as the norbornene resin or the like is dissolved in an organic solvent and is used as an adhesive, the cycloolefin polymer has poor stability over time in the organic solvent, and viscosity of the organic solvent in which the cycloolefin polymer is dissolved increases.

The present invention is accomplished in view of this problem, and its object is to provide an adhesive composition which holds down the increase in viscosity over time.

Solution to Problem

In order to attain the object, an adhesive composition according to the present invention is an adhesive composition in which a solid component is dissolved in a solvent, the solid component being dissolved in the solvent to have a solid component content of not less than 20% by weight with respect to a total amount of the solid component and the solvent, the solid component containing resin obtained by polymerizing a monomer composition that contains a cycloolefin monomer, the solvent having no carbon-carbon double bond, and an alcohol content contained in the solvent being not more than 0.45% by weight with respect to an entire amount of the solvent.

Advantageous Effects of Invention

According to the present invention, it is possible to provide an adhesive composition in which the increase in viscosity caused by the elapse of time is held down.

For a fuller understanding of the nature and advantages of the invention, reference should be made to the ensuing detailed description taken in conjunction with the accompanying drawings.

DESCRIPTION OF EMBODIMENTS

An adhesive composition according to the present invention is an adhesive composition in which a solid component is dissolved in a solvent, the solid component being dissolved in the solvent to have a solid component content of not less than 20% by weight with respect to a total amount of the solid component and the solvent, the solid component containing resin obtained by polymerizing a monomer composition that contains a cycloolefin monomer, the solvent having no carbon-carbon double bond, and an alcohol content contained in the solvent being not more than 0.45% by weight with respect to an entire amount of the solvent.

The inventors of the present invention carried out diligent study to attain the foregoing object. As a result, the inventors found that particularly alcohol from among the components contained in the solvent as impurities gives effect on the stability over time, namely the increase in viscosity together with elapse of time. The present invention is accomplished based on this completely new finding.

Solid Component

The solid component included in the adhesive composition according to the present invention contains resin obtained by polymerizing a monomer composition that contains a cycloolefin monomer.

The cycloolefin monomer is not particularly limited, however is preferably a norbornene monomer. The norbornene monomer may be any norbornene monomer as long as it has a norbornene ring. Examples of the norbornene monomer encompass: bicyclic structures such as norbornene and norbornadiene; tricyclic structures such as dicyclopentadiene and dihydroxypentadiene; tetracyclic structures such as tetracyclododecene; pentacyclic structures such as cyclopentadiene trimer; heptacyclic structures such as tetracyclopentadiene; and alkyl (e.g., methyl, butyl, propyl, and butyl) substitution products, alkenyl (e.g., vinyl) substitution products, alkylidene (e.g., ethylidene) substitution products, and aryl (phenyl, tolyl, and naphthyl) substitution products. Among these norbornene monomers, norbornene, tetracyclododecene, and alkyl substitution products thereof which are represented by the following general formula (I) are particularly preferable, in view of solubility and adhesiveness. Just one type of the cycloolefin monomer may be used, or two or more types of the cycloolefin monomers may be used in combination.

Chem. 1

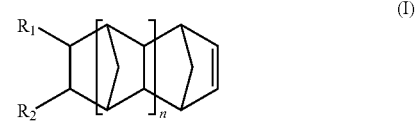

where in general formula (I), $R_1$ and $R_2$ are each independently a hydrogen atom or a C1 to C6 alkyl group, and n is 0 or 1.

A monomer composition used for manufacturing resin may contain, other than the cycloolefin monomer, another monomer that is copolymerizable with the cycloolefin monomer. A non-alicyclic aliphatic olefin monomer may be contained as the another monomer. Further, an olefin monomer (a2) represented by the following general formula (II) may be contained as the non-alicyclic aliphatic olefin monomer:

Chem. 2

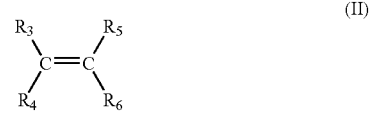

where in general formula (II), $R_3$ to $R_6$ are each independently a hydrogen atom or a C1 to C4 alkyl group.

The olefin monomer may be straight-chained or may be branched. Examples of the olefin monomer encompass α-olefin such as ethylene, propylene, 1-butene, isobutene, and 1-hexene. Just one type of the olefin monomer may be used, or two or more types of the olefin monomer may be used in combination.

In a case where the monomer composition for producing the resin contains a monomer other than the cycloolefin monomer, it is preferable that the content of the cycloolefin monomer be not less than 50% by weight with respect to the entire monomer composition, and is more preferable that the content of the cycloolefin monomer be not less than 60% by weight of the entire monomer composition. In a case where the content of the cycloolefin monomer is not less than 50% by weight of the entire monomer composition, it is possible to further improve the adhesive strength of the adhesive composition in a high temperature environment.

Moreover, it is preferable that a solid component contained in the adhesive composition according to the present invention be made just of resin obtained by polymerizing a monomer composition containing a cycloolefin monomer. Such a resin has a high thermal resistance.

How the monomer composition is polymerized and a condition and the like of the polymerization are not particularly limited, and methods thereof can be appropriately selected in accordance with conventionally known methods. Note that commercially available resin later described may be used as the resin.

(Molecular Weight)

The resin has a weight average molecular weight (Mw: measured value of gel permeation chromatography (GPC) in terms of polystyrene) of not less than 50,000 but not more than 200,000, more preferably has that of not less than 50,000 but not more than 150,000, and further preferably has that of not less than 70,000 but not more than 120,000. As long as the weight average molecular weight of the resin is within the foregoing range, it is possible to attain a good thermal resistance under high temperature processing while maintaining solubility of the resin.

Moreover, a molecular weight distribution represented by a ratio (Mw/Mn) of the weight average molecular weight (Mw) and a number average molecular weight (Mn) of the resin is preferably not less than 1.0 but not more than 5.0, and is further preferably not less than 1.0 but not more than 3.0. As long as the molecular weight distribution of the resin is within the foregoing range, it is possible to reduce an amount of released gas.

(Thermal Decomposition Temperature)

The resin preferably has a thermal decomposition temperature of not less than 250° C., more preferably has that not less than 300° C., and particularly preferably has that not less than 350° C. If the thermal decomposition temperature of the resin is not less than 250° C., the thermal resistance improves even more; this allows for preventing deterioration of the adhesive composition in a high temperature environment, and reduces the amount of released gas.

(Glass Transition Temperature)

The resin preferably has a glass transition temperature (Tg) of not less than 60° C., more preferably has that not less than 70° C., and particularly preferably has that not less than 80° C. With the glass transition temperature of the resin as not less than 60° C., it is possible to prevent the adhesive composition from softening even if the adhesive composition is exposed to a high temperature environment, and thus allows for holding down the possibility of poor adhesion.

(Other Features of Resin)

The resin preferably is a resin which has no polar group. By having the resin have no polar group, it is possible to hold down the generation of gas in the adhesive composition in a high temperature environment, and thus can prevent the deterioration of the adhesive composition and an adhesive layer made of the adhesive composition.

Examples of commercially available products that can be used as the resin encompass: "TOPAS" (product name) manufactured by Polyplastics Co., Ltd.; "APEL" (product name) manufactured by Mitsui Chemicals, Inc.; "ZEONOR" (product name) and "ZEONEX" (product name) each manufactured by ZEON CORPORATION; and "ARTON" (product name) manufactured by JSR Corporation.

Solvent

In the adhesive composition according to the present invention, the solvent in which the solid component is dissolved has no carbon-carbon double bond, and an alcohol content contained in the solvent is not more than 0.45% by weight with respect to an entire amount of the solvent.

A solvent not having a carbon-carbon double bond is, in other words, a saturated aliphatic hydrocarbon solvent. For instance, examples thereof are p-menthane, pinane, and the like, and from among these solvents, p-menthane is preferably used.

The alcohol content contained in the solvent may be any amount as long as it is not more than 0.45% by weight with respect to the entire amount of the solvent. However, the alcohol content is more preferably 0.25% by weight with respect to the entire amount of the solvent. With the alcohol content of not more than 0.45% by weight with respect to the entire amount of the solvent, it is possible to hold down the viscosity change of the adhesive composition which changes with the elapse of time, and with the alcohol content of not more than 0.25% by weight, it is possible to hold down the viscosity change even further. The lower the alcohol content, the better. That is to say, it is preferable that the alcohol content is 0% by weight.

Solid Component Concentration

In the adhesive composition according to the present invention, the content of the solid component in the solvent can be determined as appropriate in accordance with its purpose, as long as the content is not less than 20% by weight with respect to a total amount of the solid component and the solvent. In a case where the adhesive composition is used to temporally fasten the semiconductor wafer onto a supporting body, it is preferable that the content is not less than 20% by weight but not more than 40% by weight, and is more preferable as not less than 25% by weight but not more than 35% by weight, since the adhesive composition is preferably applied on the semiconductor wafer so that a film having a thickness of not less than 15 μm is formed on the semiconductor wafer.

Other Components

Other than the solid component and the solvent, the adhesive composition of the present invention may contain additives such as a plasticizing agent and an antioxidant as necessary, as long as these additives are added within the range in which the effect of the present invention is achievable.

The following descriptions are Examples to further describe the embodiment of the present invention in details. It is needless to say that the present invention is not limited to the following Examples, and various modifications are possible regarding details thereof. Furthermore, the invention being thus described, it will be obvious that the same way may be varied in many ways. Such variations are not to be regarded as a departure from the spirit and scope of the invention, and all such modifications as would be obvious to one skilled in the art are intended to be included within the scope of the following claims. Moreover, the literatures described in the present specification are all incorporated by reference.

EXAMPLES

Evaluation of Viscosity Change

In the following Example, the viscosity change was evaluated by the following method.

First, viscosity of adhesive compositions obtained in each of Examples were measured with a capillary viscometer VMC-252 (manufactured by RIGO CO., LTD.) based on a rate (time) at which the adhesive composition passes through a narrow tube by itself, by sampling 15 ml each of the adhesive compositions to a Cannon-Fenske viscometer in a thermostat oven set at 25° C.

Next, these adhesive compositions were left to stand for 3 days in an environment of 5° C. (in Example 3, the adhesive composition were left to stand for either 2 weeks or 4 weeks).

Thereafter, the viscosity was measured again.

If the viscosity change was not more than 3%, the adhesive composition was evaluated as "G", and if the change was more than 3%, the adhesive composition was evaluated as "P".

Example 1

Solid Component Concentration and Viscosity Change 1

A cycloolefin copolymer obtained by copolymerizing norbornene and ethylene with a metallocene catalyst was used as the solid component ("TOPAS (product name) 6013" manufactured by Polyplastics Co., Ltd.; norbornene:ethylene=50:50 (weight ratio), Mw: 83,300, Mw/Mn: 1.72). The viscosity change of the adhesive composition obtained by dissolving this solid component into each of solvents in proportions as shown in Table 1 were measured. Results thereof are shown in Table 1. The solvents used were: p-menthane manufactured by Nippon Terpene Chemicals, Inc., pinane manufactured by Nippon Terpene Chemicals, Inc., D-limonene manufactured by YASUHARA CHEMICAL Co., Ltd., "SWACLEAN" (product name) manufactured by Maruzen Petrochemical Co., Ltd., "dipentene T" (product name) manufactured by Nippon Terpene Chemicals, Inc., turpentine oil manufactured by Nippon Terpene Chemicals, Inc., "PEGASOL 3040" (product name) manufactured by Exxon Mobil Corporation, which is a mixture of an aliphatic hydrocarbon, and "EXXSOL D-40" (product name) manufactured by Exxon Mobil Corporation, which is a mixture of a naphthene hydrocarbon. Note that p-menthane and pinane have no carbon-carbon double bond, and the solvents other than these have the carbon-carbon double bond.

TABLE 1

|  | 10 wt % | 15 wt % | 20 wt % | 25 wt % |
| --- | --- | --- | --- | --- |
| p-menthane | G | G | G | G |
| pinane | G | G | G | G |
| D-limonene | G | G | P |  |
| SWACLEAN | G | G | P (gelatinized) |  |
| dipentene T | G | G | P |  |
| turpentine oil | G | G | P |  |
| PEGASOL 3040 | G | G | P (gelatinized) |  |
| EXXSOL D-40 | G | G | P (gelatinized) |  |

Note:
"wt %" denotes "% by weight"

As shown in Table 1, the solvents not having the carbon-carbon double bond (saturated aliphatic hydrocarbon solvents) were observed as holding down the viscosity change.

The "(gelatinized)" in Table 1 indicates that the adhesive composition gelatinized (the same applies with Table 2).

Example 2

Solid Component Concentration and Viscosity Change 2

A cycloolefin copolymer obtained by copolymerizing norbornene and ethylene with a metallocene catalyst was used as the solid component ("TOPAS (product name) 8007" manufactured by Polyplastics Co., Ltd.; norbornene:ethylene =65:35 (weight ratio), glass transition temperature: 70° C., Mw: 98,200, Mw/Mn: 1.69, thermal decomposition temperature: 459° C.). The viscosity change of the adhesive compositions obtained by dissolving the solid component into each of the solvents in proportions as shown in Table 2, were measured. The results thereof are shown in Table 2. The solvent used were the same as those used in Example 1.

TABLE 2

|  | 10 wt % | 15 wt % | 20 wt % | 25 wt % |
| --- | --- | --- | --- | --- |
| p-menthane | G | G | G | G |
| pinane | G | G | G |  |
| D-limonene | G | G | P |  |
| SWACLEAN | G | G | P (gelatinized) |  |
| dipentene T | G | G | P |  |
| turpentine oil | G | G | P |  |
| PEGASOL 3040 | G | G | P (gelatinized) |  |
| EXXSOL D-40 | G | G | P (gelatinized) |  |

Note:
"wt %" denotes "% by weight"

As shown in Table 2, it was observed that the viscosity change was held down in the solvents not having a carbon-carbon double bond (the saturated aliphatic hydrocarbon solvents).

Example 3

Alcohol Concentration and Viscosity Change

"TOPAS (product name) 8007" was used as the solid component, and p-menthane was used as the solvent. As p-menthane, p-menthane manufactured by Nippon Terpene Chemicals, Inc. (purity 98.2%), p-menthane manufactured by YASUHARA CHEMICAL Co., Ltd. (purity 96.0%, product name: Woodyriver #10), and p-menthane manufactured by HUNAN SONGYUAN CHEMICAL Co., Ltd. (purity 95.1%) were used. Moreover, methanol or isopropanol (IPA) was added to p-menthane manufactured by Nippon Terpene Chemicals, Inc., to evaluate the effect of alcohol. The concentration of the added alcohol were 1% by weight, 0.5% by weight, 0.45% by weight, and 0.25% by weight, each with respect to a total amount of p-menthane and alcohol (0.99% by weight, 0.49% by weight, 0.44% by weight, and 0.25% by weight each with respect to the amount of p-menthane, respectively). Moreover, the viscosity change thereof was measured after being left to stand for 2 weeks or for 4 weeks in an environment of a standing temperature of 5° C. The results thereof are shown in Table 3.

TABLE 3

|  | Purity | Alcohol content | 25 wt % after 2 w | 25 wt % after 4 w | 30 wt % after 2 w | 30 wt % after 4 w |
|---|---|---|---|---|---|---|
| p-menthane (Nippon Terpene Chemicals, Inc.) | 98.2 | <0.1 | G | G | G | G |
| Woodyriver #10 (YASUHARA CHEMICAL Co., Ltd.) | 96.0 | <0.1 | G | G | G | G |
| p-menthane (HUNAN SONGYUAN CHEMICAL Co., Ltd.) | 95.1 | 0.5 | G | P | G | P |
| p-menthane (Nippon Terpene Chemicals, Inc.) + methanol 1 wt % | | 1.0 (0.99) | P | P | P | P |
| p-menthane (Nippon Terpene Chemicals, Inc.) + methanol 0.5 wt % | | 0.5 (0.49) | G | P | G | P |
| p-menthane (Nippon Terpene Chemicals, Inc.) + methanol 0.45 wt % by weight | | 0.45 (0.44) | G | G | G | G |
| p-menthane (Nippon Terpene Chemicals, Inc.) + methanol 0.25 wt % | | 0.25 (0.25) | G | G | G | G |
| p-menthane (Nippon Terpene Chemicals, Inc.) + IPA 1 wt % | | 1.0 (0.99) | G | P | G | P |
| p-menthane (Nippon Terpene Chemicals, Inc.) + IPA 0.5 wt % | | 0.5 (0.49) | G | P | G | P |
| p-menthane (Nippon Terpene Chemicals, Inc.) + IPA 0.25 wt % | | 0.25 (0.25) | G | G | G | G |

Note:
"wt %" denotes "% by weight"
*As to "Alcohol content", the values without brackets each denotes a % by weight of alcohol with respect to a total amount of the solvent including the alcohol, and the values inside the brackets each denotes a % by weight of the alcohol with respect to the amount of the solvent excluding the amount of alcohol.

As shown in Table 3, the Examples exhibited an extremely good result (a result in which the viscosity change is extremely small) when the alcohol content is not more than 0.45% by weight with respect to the entire amount of the solvent.

Example 4

Observation of Alcohol in p-menthane

From among the p-menthanes used in Example 3, p-methane manufactured by HUNAN SONGYUAN CHEMICAL Co., Ltd. detected three types of alcohol components each having a molecular weight of 140 to 150, by performing 1H-NMR with GC/MS (manufactured by Perkin Elmer Inc.) of the alcohol component contained therein.

Industrial Applicability

An adhesive composition according to the present invention is suitably used for processing semiconductor wafers and the like.

The invention claimed is:

1. An adhesive composition comprising a solid component dissolved in a solvent, wherein:
the solvent is p-menthane, and the solid component dissolved in the solvent comprises a solid component content of not less than 20% by weight with respect to a total amount of the solid component and the solvent,
the solid component comprises a resin obtained by polymerizing a monomer composition that contains a cycloolefin monomer, and
the solvent comprises an alcohol content of not more than 0.45% by weight with respect to an entire amount of the solvent.

2. The adhesive composition according to claim 1, wherein the alcohol content is not more than 0.25% by weight with respect to the entire amount of the solvent.

3. The adhesive composition according to claim 1, wherein the cycloolefin monomer is a norbornene monomer.

4. The adhesive composition according to claim 1, wherein:
a content of the cycloolefin monomer is not less than 50% by weight with respect to a total amount of the monomer composition.

* * * * *